REVERSE CYCLE AERODYNAMIC WAVE MACHINE

Filed March 19, 1957 4 Sheets-Sheet 1

INVENTOR.
ERNST NIEDERMANN
BY Ostrolenk, Faber, Gerb & Soffen
ATTORNEYS

INVENTOR.
ERNST NIEDERMANN
BY Ostrolenk, Faber, Gerb & Soffen
ATTORNEYS

REVERSE CYCLE AERODYNAMIC WAVE MACHINE

Filed March 19, 1957 4 Sheets-Sheet 3

INVENTOR.
ERNST NIEDERMANN
BY Ostrolenk, Faber,
Gerb & Soffen
ATTORNEYS

Nov. 8, 1960 E. NIEDERMANN 2,959,344

REVERSE CYCLE AERODYNAMIC WAVE MACHINE

Filed March 19, 1957 4 Sheets-Sheet 4

INVENTOR.
ERNST NIEDERMANN

BY Ostrolenk, Faber, Gerb & Soffen

ATTORNEYS

United States Patent Office 2,959,344

Patented Nov. 8, 1960

2,959,344

REVERSE CYCLE AERODYNAMIC WAVE MACHINE

Ernst Niedermann, Zurich, Switzerland, assignor to I-T-E Circuit Breaker Company, Philadelphia, Pa., a corporation of Pennsylvania Filed Mar. 19, 1957, Ser. No. 647,091

9 Claims. (Cl. 230—69)

My present invention relates to a reverse cycle aerodynamic wave engine of the type described in copending application Serial No. 637,570, filed January 31, 1957 entitled Reverse Cycle Aerodynamic Wave Machine to Max Berchtold as distinguished from a forward cycle described in copending application Serial No. 454,774, filed September 8, 1954 entitled Wave Engine by Max Berchtold and assigned to assignee of instant invention and more particularly is directed to a physical arrangement whereby the intake port is closed early in the low pressure cycle to reduce kinetic energy losses in the exhaust and increase the pressure at the pick-up port relative to the pressure at the nozzle.

In aerodynamic wave machines, a compression wave, generated by the introduction of a first gas impinging upon a second gas, travels through the second gas at a speed greater than the speed of the interface between the two gases to thereby directly transmit energy from the first gas to the second gas.

The actual bodily movement of the gases is used to admit to the rotor a first gas to be expanded, discharge from the rotor the expanded first gas, to admit to the rotor a second gas to be compressed, and to discharge from the rotor the second compressed gas. The interrupted bodily movement of the gases results in both expansion and compression waves which result in the discharge of energy.

The aerodynamic wave machine of the aforementioned copending application Serial No. 454,774 sets forth an arrangement whereby instationary flow is utilized for the purpose of compressing a second gas with a compression wave created by the expansion of a first gas. The invention set forth in the aforementioned copending application Serial No. 454,774 resides primarily in the physical relationship of the ports and their respective leading and trailing edges with respect to each other to thereby achieve not only maximum performance of an aerodynamic wave machine, but in fact an operative structure over the prior art.

In the above noted aerodynamic wave machine, both the first gas nozzle and the second gas intake are located in one stator and the second gas pick-up port along with the first gas exhaust are located in a second stator. Hence, both gases enter the rotor through one stator plate and are exhausted through the other stator plate. This cycle is referred to as the forward cycle since both gases flow in the same direction through the rotor.

The aforementioned copending application Serial No. 637,570 (hereinafter referred to as the prior art reverse cycle) is directed to a reverse cycle aerodynamic wave machine wherein the first gas nozzle and the second gas air intake are respectively in opposite ports, and in like manner, the second gas pick-up and first gas exhaust are also respectively in opposite ports. Therefore, the first gas always enters and leaves the rotor through one stator and the second gas always enters and leaves the rotor through the other stator. This cycle of operation is referred to as the reverse cycle.

The instant invention is an improvement of the above noted reverse cycle aerodynamic wave machine and is structurally distinguished from the aforementioned copending application Serial No. 637,570 by positioning the trailing edge of the intake port so that kinetic energy losses in the exhaust are reduced.

By having the intake port trailing edge close off the port before the exhaust port is closed, there will be an expansion wave created rather than a compression wave, as is the case in Serial No. 454,774 and Serial No. 636,570. This expansion wave will decrease the pressure so that a lower pressure gas is exposed to the nozzle which in turn will create an increased flow velocity into the channels. This results in stronger compression wave which builds the pressure to the value previously obtained in a reverse cycle as set forth in Serial No. 637,570. Therefore, the expansion wave created by closing off the nozzle is increased to thereby reduce the pressure to a magnitude below that previously obtained. As a result thereof, there will be a reduced expansion wave when the exhaust port is opened so that there is a reduction in the exhaust velocity. Since exhaust velocity represents a major loss of energy, my instant invention results in a more efficient device by reducing this loss.

When the aerodynamic wave machine is provided with my novel reverse cycle and used as a supercharger for such devices as diesel engines, it becomes a self-controlled device and inherently adapts itself to the particular characteristics of the diesel engine. Thus, for example, if the weight flow created by the supercharger is in excess of that absorbed by the reciprocating engine there will be a receiving compression wave created which in turn will create a desirable condition of increasing the pressure at the pick-up port. That is, the receiving wave will reduce the velocity of the gas in the channel so that the second gas in the pick-up port is elevated to a pressure higher than the pressure of the first gas in the nozzle.

When this condition exists in the structural arrangement of my instant invention it is possible to further increase the pressure at the pick-up port. That is, as previously noted, the velocity in the high pressure stage is considerably increased due to the new compression wave. This increased velocity will result in a stronger receiving wave which therefore will have an increased pressure behind it at the pick-up port.

In addition to the above advantages, my novel low pressure aerodynamic wave machine still retains all of the advantages of a standard reverse cycle device such as (1) does not require a critical relationship between leading edge of nozzle and the trailing edge of the pick-up port; (2) does not require a blower; (2*a*) can utilize an inactive plug as a thermal barrier; (3) is particularly adapted for low temperature operation; (4) reduces thermal stresses in stators; (5) adaptable to have cantilever support for rotor; (6) adapts itself to the flow requirement of a reciprocating engine when used as a supercharger.

Accordingly, a primary object of my invention is to provide a novel structural arrangement which particularly is adapted for a low pressure operation in which the intake port is closed before the exhaust port is closed.

Another object of my invention is to provide a reverse cycle aerodynamic wave machine in which the kinetic energy losses in the exhaust are reduced.

A still further object of my instant invention is the provision of a relationship of trailing edges of the intake and exhaust ports whereby the pressure is reduced due to the creation of an expansion wave to thereby reduce the exhaust velocity.

A still further object of my invention is to provide a low pressure aerodynamic wave machine in which the effectiveness of a receiving wave at the pick-up port is substantially increased.

These and other objects of my invention will be apparent from the following description when taken in connection with the drawings in which.

Figure 2A:
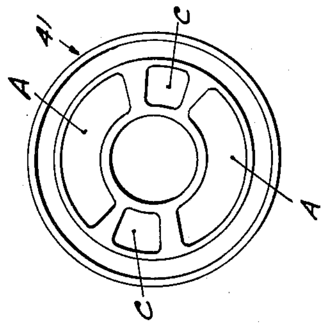
Figure 2 is a cross-sectional view of the rotor and stator plates and is taken in the direction of the arrows 2—2 of Figure 4.
Figures 1, 2, 2B, 3:
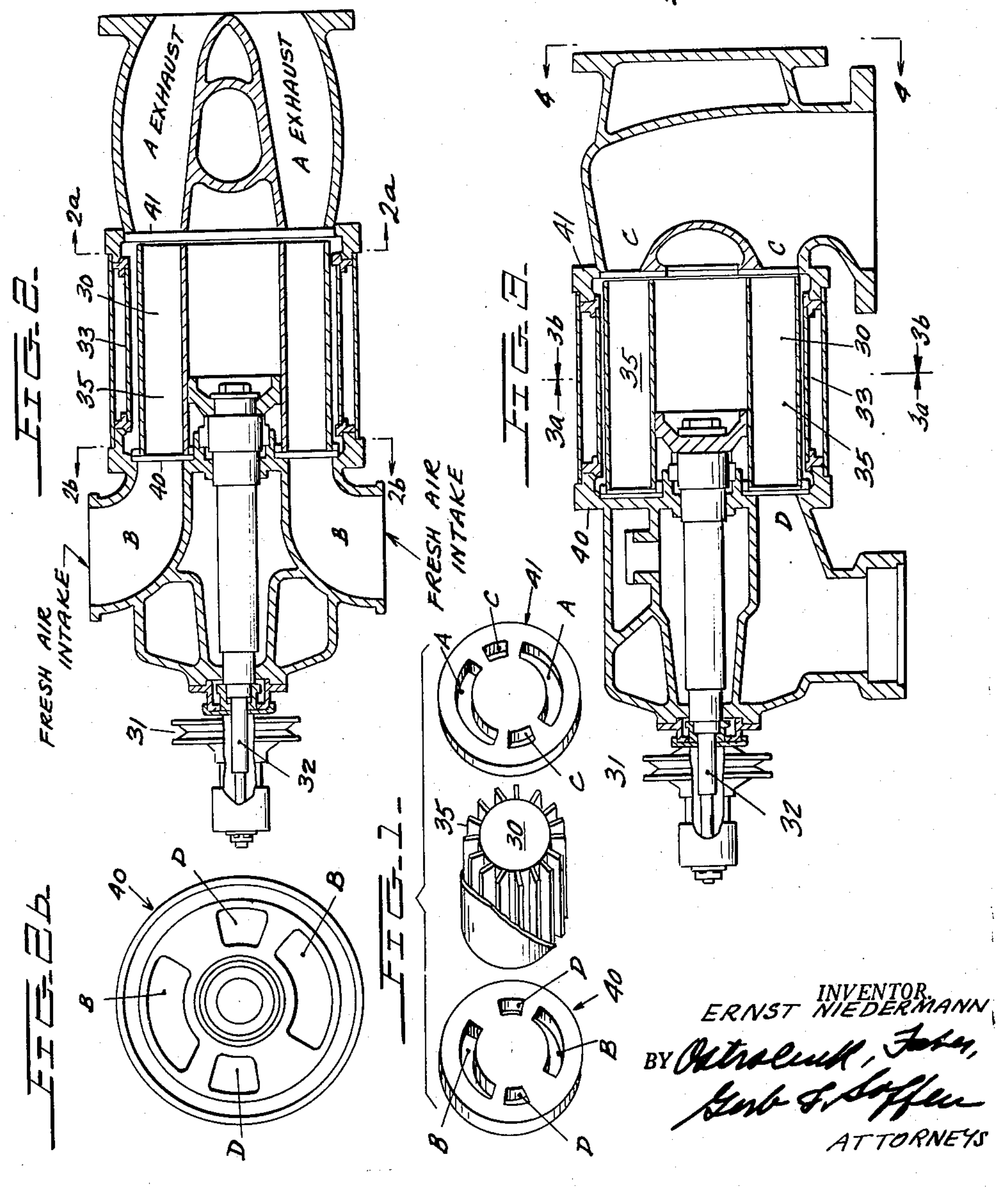
Figure 1 is a schematic perspective view showing a rotor and its port and illustrating the reverse cycle of my invention in which the nozzle and exhaust port for the hot first gas are contained in one stator and the pick-up and air intake port for the cold second gas are contained in the other stator. This figure illustrates two cycles per revolution.

Figure 2*a* is a view taken in the direction of the arrows **2*a*—2*a*** of Figure 2 and illustrates one stator.

Figure 2*b* is a view taken in the direction of the arrows **2*b*—2*b*** of Figure 2 and illustrates the other stator plate.

Figure 4:
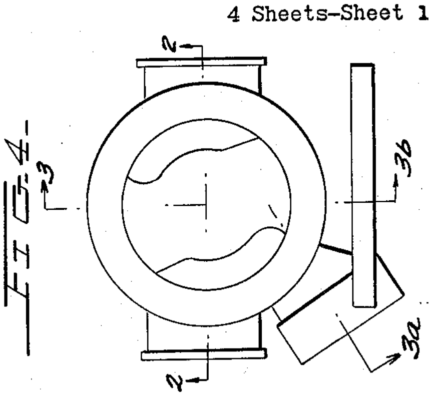

Figure 3 is another cross-sectional view of the rotor and stator similar to Figure 2, the left portion of which is taken in the direction of the arrows 3—3–*a* of Figure 4, the right portion of which is taken in the direction of arrows 3—3–*b* of Figure 4.

Figure 4 is an end view taken in the direction of the arrows 4—4 of Figure 3.

Figure 5:
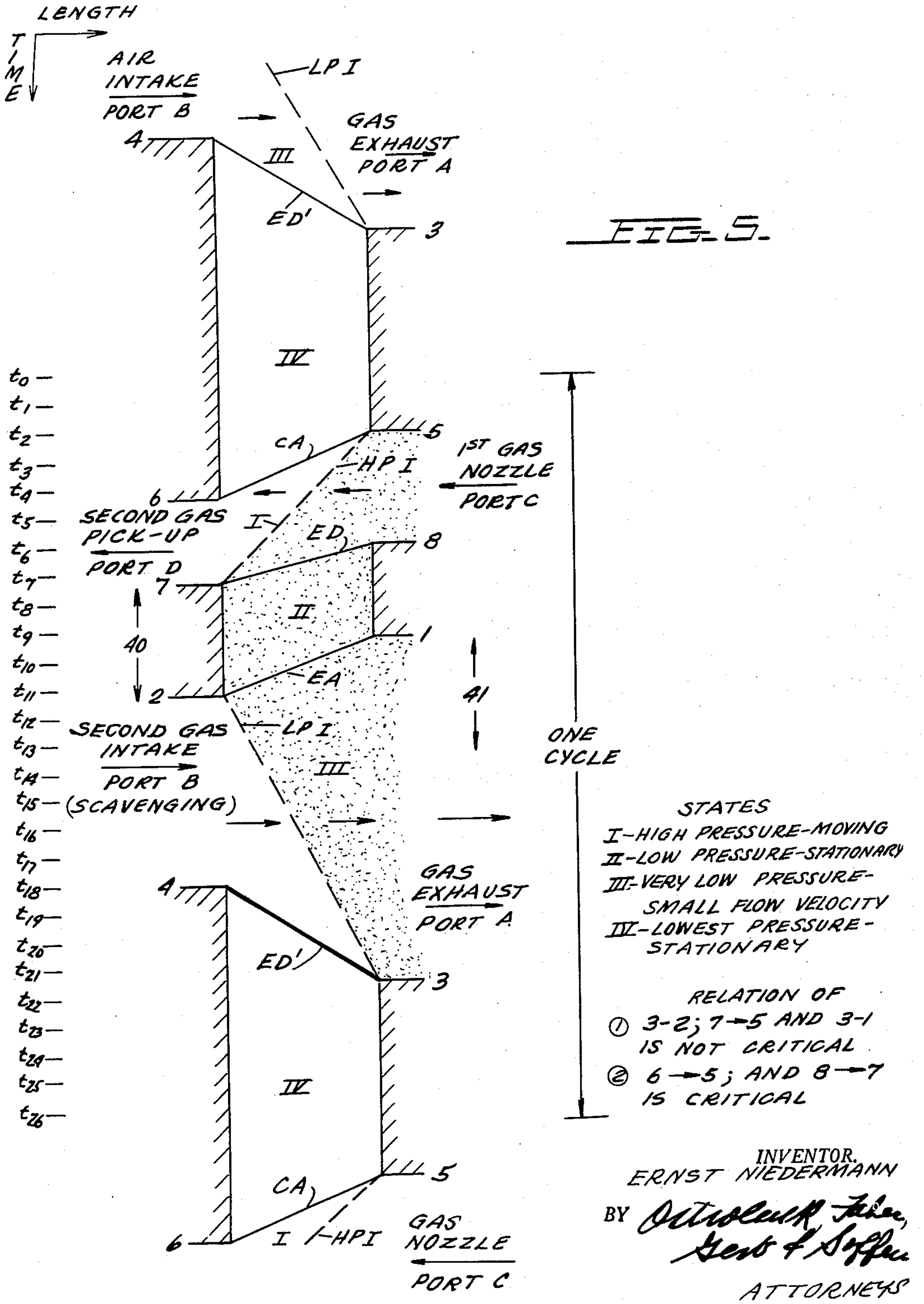

Figure 5 is a schematic developed view of the rotor and port showing the condition of gases in each section of the rotor for my novel construction. This view illustrates the cycle of operation at design conditions and illustrates an ideal design cycle.

Figure 6:
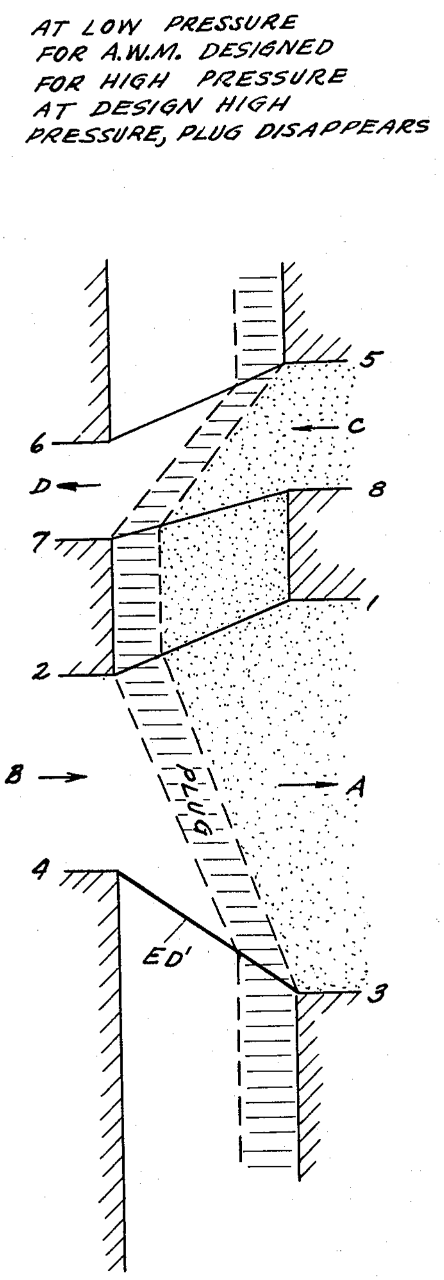

Figure 6 is a schematic developed view of the rotor and ports showing the condition of the gases in each section of the rotor and is similar to Figure 5 but illustrates an idealized cycle of operation at reduced pressure in which the inactive plug remains throughout the complete cycle of operation.

Figure 7:
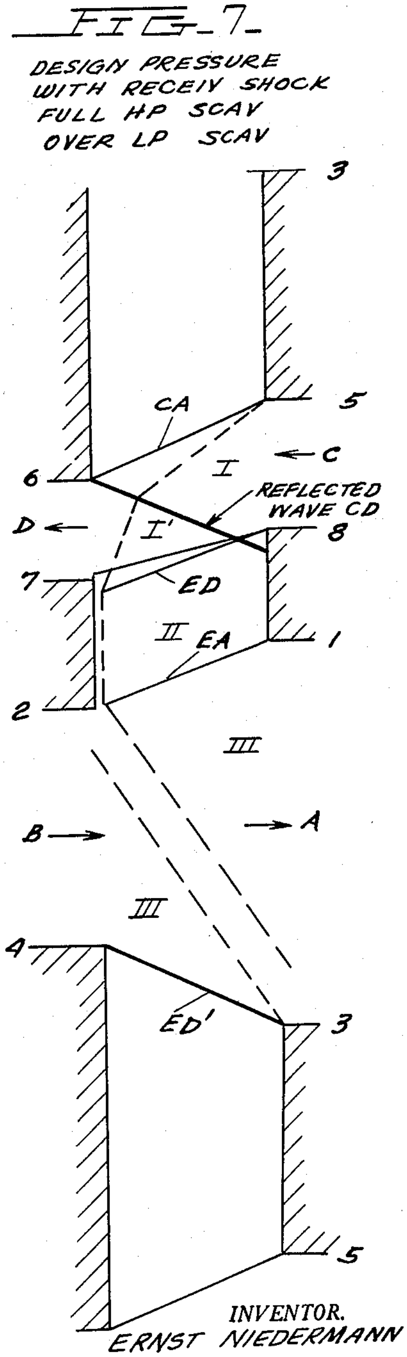

Figure 7 is a schematic developed view of the rotor and ports showing the condition of the gases in each section of the rotor for complete high pressure scavenging with excessive over low pressure scavenging.

Figure 8A:
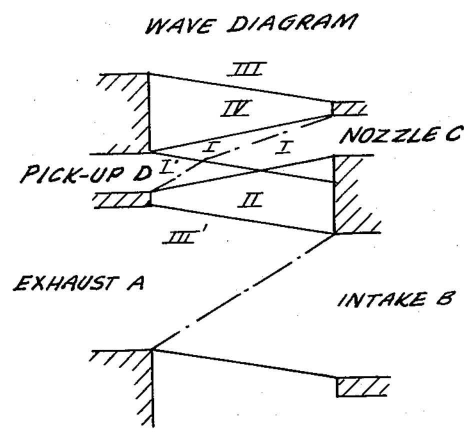

Figure 8*a* is a partial schematic developed view of a rotor and parts illustrating a forward cycle.

Figure 8B:
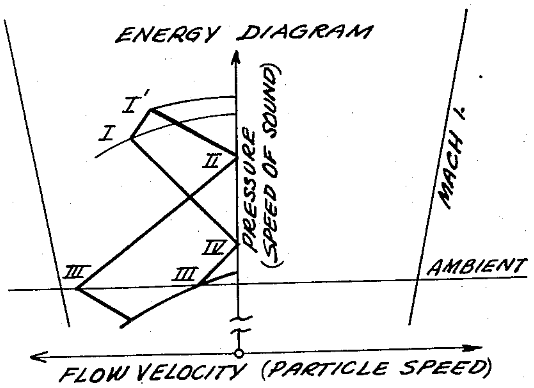

Figure 8*b* is an energy diagram of the cycle of Figure 8*a*.

Figure 9A:
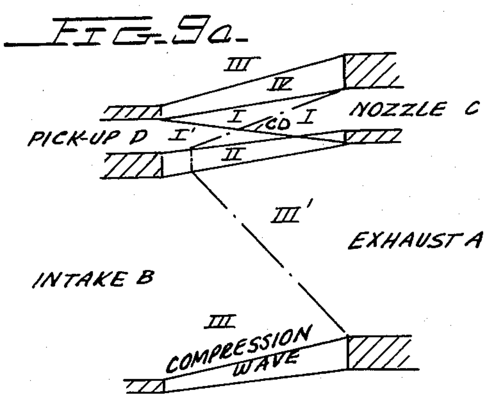

Figure 9*a* is a partial schematic developed view of a rotor and parts with a standard reverse cycle.

Figure 9B:
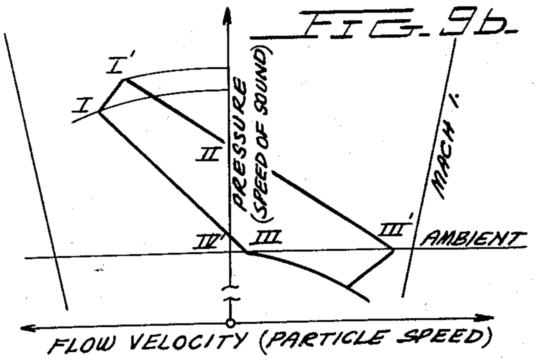

Figure 9*b* is an energy diagram of the cycle of Figure 9*a*.

Figure 10A:
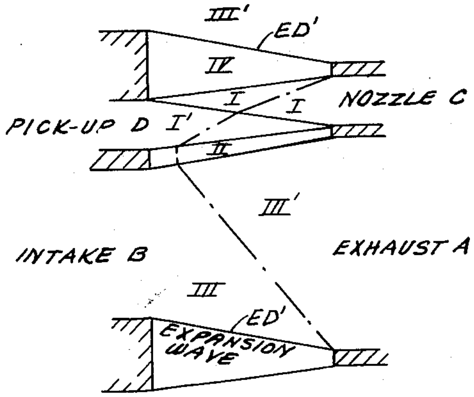

Figure 10*a* is a partial schematic developed view of a rotor and parts with a reverse cycle construction of my instant invention.

Figure 10B:
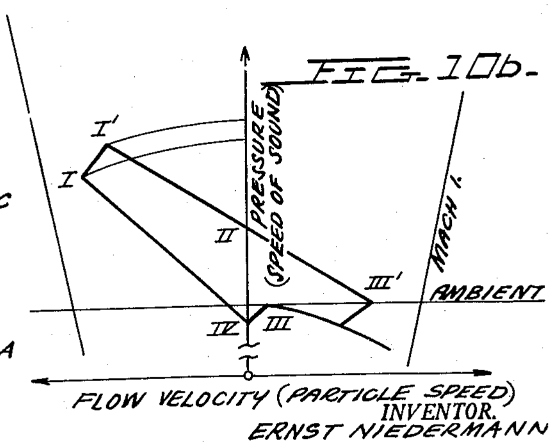

Figure 10*b* is an energy diagram of the cycle of Figure 10*a*.

Referring first to Figures 1–4, the rotor 30 is driven for rapid rotation about its axis in any suitable manner as by a belt drive over pulley 31 to the rotor shaft 32. The rotor 30 is a drum having an outer shell 33 and a plurality of cells 35 extending more or less parallel to the axis of the rotor adjacent the periphery thereof.

Two stators 40 and 41 are placed on opposite sides of the rotor 30 in the closest possible proximity thereto consistent with the high-speed rotation required in the rotor to obtain the best possible gas tight seal. The stator 41 on the left side of the rotor 30 is provided with nozzle C for the input of a first gas at elevated pressure and an exhaust port A for exhausting the first gas at approximately ambient pressure.

Stator 40 on the right side of the rotor 30 is provided with pick-up port D for the output of a second gas at elevated pressure and air intake port B for the intake of the second gas at ambient pressure.

The rotor 30 is rotated at the speed which produces the required timing for the waves and the interfaces with respect to the ports.

As the individual cells of the rotor move successively past the opposite ports D and C and then B and A, the creation and propagation of the various waves as well as pressure interchanges which occur owing to the movements of the interfaces are demonstrated in the developed views of Figure 5.

Within the high pressure state I the leading edges 5 and 6 are physically related to each other and the trailing edges 7 and 8 are physically related to each other, the cycle of operation is totally independent of the length of time of the medium state II. There is no relation between the ports at high pressure state I and low pressure state III.

Figure 5 illustrates an ideal condition in which there is complete high and low pressure scavenging so that all interfaces are restricted to a minimum width.

The action of the waves can be more readily understood by cutting a narrow slot in a sheet of paper representing a typical cell 55 and sliding this slot transversely down Figure 5.

In Figure 5 the second gas is represented by unmarked area and the first gas is represented by the dotted area. The movement of the gas is indicated by arrows.

It should be noted that the second gas at approximately ambient pressure is always present at intake port B and that the first gas at high pressure is always present at nozzle C.

The cells of the rotor are continuously moving past the ports and the closed spaces between ports. Thus, the cycle, for purposes of description, may start at any point. For example, the initial description will start at time *t*–8 when a cell 35 has passed pick-up port D and nozzle C but has not yet reached intake port B or gas exhaust port A. At time *t*–8 the cell is closed at both ends by stators 40 and 41. The first gas is trapped in the cell at an elevated pressure.

Design consideration will determine the length of time that the cell is closed at both ends during state II. That is, the physical length between the edges 8 and 1 and the edges 7 and 2, respectively. In fact the opening edge 1 could be positioned above the closing edge 7 thereby keeping the pressure of the gas at state II to a minimum so that at no time are all the gas particles at rest.

At time 9 the cell 35 is opened at its right end to the leading edge 1 of gas exhaust port A, and is connected with the exhaust port A at ambient pressure which is lower than the pressure in the cell. Thus, an expansion acceleration (EA) wave starts travelling through the cell, starting at point 1. The pressure in front of this wave (EA) is at state II and the pressure behind the wave (EA) is at the pressure existing in the exhaust A. The exhaust velocity depends on the pressure drop through the wave (EA).

As soon as the first expansion acceleration wave (EA) reaches the other cell at about time *t*–11, it is reflected and the cell is opened to the intake port B by the leading edge 2.

Since the pressure in the cell behind wave EA is lower than the total pressure in the scavenging intake port B, the first gas starts flowing into the cell. The whole contents of the cell is now moving, with the second gas replacing the first gas. Thus the remaining second gas in the cell from time *t*–9 till time *t*–21 is being scavenged out.

At time *t*–18, which is prior to the time that the exhaust port A is closed, the intake port B is closed by the trailed edge 4. It should be noted that this physical relationship between the trailing edge 3 and 4 of the exhaust port A and intake port B, respectively, represents the structural distinction between the instant invention and the aerodynamic wave machine of the prior art. The closing of the intake port B prior to the closing of the exhaust port A has the effect of creating an expansion wave ED′ which both reduces the pressure and slows down the flow of the gas particles.

The right end of the cell is closed off at time $t$–21 by trailing edge 3 when all of the hot gas (dotted) is scavenged out. At this time all of the second gas particles are stopped by the wave ED′. That is, the trailing edge 3 is positioned with respect to the rotor to close off the cell at the instant that the wave ED′ arrives. The pressure drop resulting from the expansion wave ED′ depends on the magnitude of the scavenging flow velocity. The expansion deceleration wave (ED′) is travelling down stream.

It should be noted that the pressure of the gas at state IV is considerably below the corresponding state in the prior art reverse cycle. That is in my novel construction the creation of wave ED′ lowers the pressure whereas in the prior art a compression wave increased the pressure.

The time at which the second gas is at rest during state IV depends only on structural considerations. At about time $t$–2 the cell reaches the leading edge 5 which opens the first gas nozzle C.

The total pressure in the nozzle C is considerably higher than the pressure of the second gas in the cell. It should be noted that this pressure differential is larger in the construction of my invention than in the standard reverse cycle due to the relatively low pressure at state IV. This results in an increased flow velocity into the cell. The first particles of gas which leave the nozzle C impinge with a certain velocity on the air and by that action compress it and put it in motion. The first particles of the air which were subject to that impingement in turn push against the particles of the air adjacent to them, compress them, put them in motion and so on. This mechanism again creates a compression acceleration wave (CA) which travels faster than the air now set in motion.

Due to the increased flow velocity the strength of the compression wave CA is stronger than the compression wave created in a standard reverse cycle machine. Therefore, the wave CA is capable of building up the low pressure gas particles to the same pressure as that existing in a standard reverse cycle machine. Thus, even though the pressure at state IV is relatively low, the pressure at state I is equal to the corresponding pressure at state I in the prior art reverse cycle machine.

At time $t$–4 when pick-up port D is reached by the left end of the cell, all the initial air is compressed and is being moved into the pick-up port D.

At the moment where the inlet nozzle C is closed at about time $t$–6, an expansion wave ED starts traveling in down stream direction through the cell thereby decreasing both the pressure and velocity.

As soon as the expansion deceleration wave (ED) reaches the other end of the cell at plate 40 at time $t$–7, the pick-up port D is closed at 7.

Due to the increased velocity at state I, the expansion wave ED is relatively stronger so that the low pressure at state II is lower than the corresponding medium pressure at state II in the prior art reverse cycle machine.

The trailing edges 8 and 7 of the nozzle C and pick-up port D respectively are physically positioned so that the expansion wave ED created at the edge 8 will arrive at the end of the cell at the time the cell is closed by the edge 7. This condition will exist at not only the design pressure ratios but also at lower pressure ratios. It should be noted that at design pressure ratios, such as illustrated in Figure 5, the leading edge 5 of the nozzle C is physically positioned with respect to the trailing edge 7 of the pick-up port D so that the high pressure interface HPF will arrive at the end of the cell at the moment the cell is closed by the trailing edge 7 of the pick-up port D. However at pressure ratios below the illustrated design pressure ratio, the trailing edge 7 of the pick-up port D will close off the cell before the arrival of the high pressure interface HPI. That is, there will be incomplete high pressure scavenging such as illustrated in Figure 6.

As previously explained the low pressure at state II is low compared to the medium pressure at this state in the prior art reverse cycle machine. Therefore, when the cells are opened to the first gas exhaust port A by the leading edge 1 at about time $t$–9, the pressure differential will be small thereby creating a weak or reduced expansion wave EA and a considerable reduction in the exhaust velocity. Since the exhaust velocity usually represents a major loss of energy, my instant invention results in a more efficient device by substantially reducing this kinetic energy loss. Thus by providing an aerodynamic wave machine in which the trailing edge 4 of intake port C is positioned ahead of the trailing edge 3 of the exhaust port A it is possible to reduce the kinetic energy losses in the exhaust. This novel arrangement therefore results in a more efficient device even through it creates an expansion wave ED′ to drop the pressure in state IV instead of a compression wave to raise the pressure as is the case in prior art devices.

The reverse cycle construction of Figure 5 has the cold intake port B and the cold pick-up port D on the same side of the rotor; and the hot exhaust port A and hot nozzle C on the other side of the rotor. Hence, all cold gases are essentially restricted to a first end of the rotor and all hot gases are essentially restricted to the second end of the rotor. However, this is not detrimental since the reverse cycle is particularly advantageous for use as a supercharger where the temperatures are relatively low and hence a portion of the rotor can remain at the temperature magnitude of the first gas without damage.

As illustrated and described in connection with Figure 5, the reverse cycle aerodynamic wave machine permits all of the first or hot gases to pass through the stator 41 and all the cold or second gas to pass through the stator 40. As illustrated the first and second gases are essentially restricted to one end of the rotor to thereby substantially reduce the heat exchange between the gases and the metal of the rotor. It is also noted that since the gases of any given temperature are essentially restricted to one end of the rotor, the thermal stress of the rotor is accordingly substantially increased. However, the rotor can have a cantilever support at the cold end as illustrated in Figure 2, so as to permit expansion of the hot end of the rotor and thus receive these thermal stresses.

In the illustration and description of Figure 5, I have illustrated the ideal design conditions and cycle. However as previously noted, the trailing edge 7 of the pick-up port D does not have to have a critical relationship to the leading edge 5 of the nozzle C. Thus, if the aerodynamic wave machine is operated below design pressures, such as seen in Figure 6, incomplete high and low pressure scavenging (between port C—D and B—A, respectively) will not be detrimental to the efficiency of the machine since it merely results in an inactive plug of fluid remaining in the machine. This inactive plug is not detrimental to the operation of the aerodynamic wave machine and in fact serves as an insulating interface between the two gases to thereby prevent contamination of the gases and retain a desirable low temperature at the pick-up port D.

Furthermore, the reverse cycle does not require all fluid to be removed during each cycle, but instead can operate properly with a plug, it is not necessary to provide the machine with a blower to either start or operate the machine.

When the aerodynamic wave machine is used as a supercharger for a reciprocating engine, it is possible that the mass flow through the pick-up port D will exceed the capacity of the mass flow requirements of the reciprocating engine. In this situation a desirable reflected or receiving wave CD (compression-deceleration), as seen in Figure 7, will be created with an elevated pressure at the pick-up port D and improved scavenging of the rotor due to increased suction.

Thus, when the pick-up port D is incapable of accepting the entire mass flow from the rotor, there will be a static pressure existing at the port D which is higher than the pressure of the fluid compressed by the compression-acceleration wave CA. Therefore, this wave CA will be reflected at the edge 6 as a reflected wave CD which compresses the fluid as it travels upstream and will decelerate the flow velocity of the fluid at state I'. This deceleration of the fluid is indicated by the change in the slope of the interface line. This deceleration will transform the energy of the fluid to a higher pressure and density which will be received at cold pick-up port D.

The creation of the reflected wave CD for a reverse cycle machine operating as a supercharger is also created in the prior art reverse cycle aerodynamic wave machine. However, as previously noted the flow velocity in state I is considerably greater than the flow velocity in the prior art reverse cycle machine since the nozzle is opened at leading edge 5 to a lower pressure gas. Thus, the fast flowing gas particles subjected to the opening of the intake port D at leading edge 6 will create a strong reflected wave CD to thereby raise the pressure at state I' not only above the pressure of the gas at state I but also above the pressure at state I' of the prior art reverse cycle machine. This will therefore result in a desirable substantial increase in the pressure differential between pick-up D and nozzle C. That is a substantial increase in the pressure of the first gas at pick-up port D.

Since the total pressure in the cold air pick-up port D is higher than the total pressure in the hot gas nozzle port C, the pressure differential is utilized during the intake and exhaust stroke of the reciprocating engine connected to the pick-up port D and the nozzle C and appears as additional shaft power output of the reciprocating engine.

It should be noted that after the reflected wave CD elevates the pressure, it is dropped by the ED wave to state II'. The resultant pressure at state II' is above state II of Figure 5 since the opening of the cell to the leading edge 1 of the exhaust port A will result in a higher exhaust velocity than without the wave CD. However, as previously noted, the structure of my invention creates a compression wave CD' which reduces the exhaust flow velocity. Thus the increasing of the exhaust flow velocity by the creation of wave CD merely brings the level of the exhaust flow velocity up to a level near that existing in the prior art reverse cycle machine. Although the full advantage of the reduced kinetic energy losses at the exhaust are not realized, the machine does have a beneficial increased pressure at the pick-up without having the exhaust kinetic energy losses of the prior art units.

Figures 8, 9 and 10 graphically illustrate the decreased exhaust kinetic energy losses which are obtained with my novel machine as compared to prior art aerodynamic wave machines; Figures 8*a* and 8*b* are cycle and energy diagrams for a forward cycle aerodynamic wave machine of the type described in copending application 454,774; Figures 9*a* and 9*b* are cycle and energy diagrams for a reverse cycle aerodynamic wave machine of the type described in copending application 637,570 and Figures 10*a* and 10*b* are a cycle and energy diagram for the structure of my instant invention. In order to draw a comparative analysis with the energy diagrams, all three machines were operated with the nozzle pressure of each machine and the pick-up pressure of each machine, respectively, being of equal magnitudes.

Under these conditions, both of the prior art machines had a relatively large exhaust velocity as seen in Figures 8*b* and 9*b* by the plot of flow velocity of state III'. However, the exhaust flow velocity of the machine constructed in accordance with my instant invention has a relatively low exhaust flow velocity as seen in Figure 10*b* by the plot of the flow velocity of state III'. Thus my novel device operated under the same conditions as the prior art units has very low exhaust kinetic energy losses.

In the foregoing, I have described my invention solely in connection with specific illustrative embodiments thereof. Since many variations and modifications of my invention will now be obvious to those skilled in the art, I prefer to be bound not by the specific disclosures herein contained but only the appended claims.

I claim:

1. An aerodynamic wave machine for operation with variable pressure ratios comprising a rotor, a first stator plate and a second stator plate, said rotor having a plurality of channels extending from said first stator plate to said second stator plate and being open at each end; said first stator plate having a nozzle port and an exhaust port; said second stator plate having a pickup port and an intake port; the ports being so physically and angularly positioned with respect to each other in said stator plates that the channels are opened and closed in the following sequence; opened by said nozzle, opened by said pickup port, closed by said nozzle, closed by said pickup port, opened by said exhaust port, opened by said intake port, closed by said intake port, closed by said exhaust port.

2. An aerodynamic wave machine having a reverse cycle of operation and comprising a rotor, a first stationary end plate and a second stationary end plate; a plurality of channels carried by said rotor and extending from a first end of said rotor to a second end; means for rotating said rotor about its axis; each of said channels being open at each end; said first stationary end plate being positioned at said first end of said rotor; said second stationary end plate being positioned at said second end of said rotor; a nozzle port and an exhaust port in said first stationary end plate; a pickup port and an intake port in said second stationary end plate; each of said ports having a leading edge and a trailing edge; said intake port being so angularly positioned with respect to said exhaust port that said channels are opened by the leading edge of said exhaust port before being opened by the leading edge of said intake port and closed off by the trailing edge of said intake port before being closed off by the trailing edge of said exhaust port.

3. An aerodynamic wave machine having a reverse cycle of operation and comprising a rotor, a first stationary end plate and a second stationary end plate; a plurality of channels carried by said rotor and extending from a first end of said rotor to a second end; means for rotating said rotor about its axis; each of said channels being open at each end; said first stationary end plate being positioned at said first end of said rotor; said second stationary end plate being positioned at said second end of said rotor; a nozzle port and an exhaust port in said first stationary end plate; a pickup port and an intake port in said second stationary end plate; each of said ports having a leading edge and a trailing edge; a first fluid introduced through said nozzle and exhausted through said exhaust port; a second fluid introduced through said intake port and removed from the machine through said pickup port said exhaust port being so physically and angularly constructed and positioned with respect to said intake port that each of said channels are opened and closed by said leading and trailing edge in the following sequence: opened by said exhaust port, opened by said intake port, closed by said intake port, closed by said exhaust port; an expansion acceleration wave created in said first fluid when said channels are opened by the leading edge of said exhaust port; an expansion deceleration wave created in said second fluid when said channels are closed by said trailing edge of said intake port.

4. An aerodynamic wave machine having a reverse cycle of operation and comprising a rotor, a first stationary end plate and a second stationary end plate; a plurality of channels carried by said rotor and extending from a first end of said rotor to a second end; means for rotating said rotor about its axis; each of said channels being open at each end; said first stationary end plate being positioned at said first end of said rotor; said second stationary end plate being positioned at said second end of said rotor; a nozzle port and an exhaust port in said first stationary end plate; a pickup port and an intake port in said second stationary end plate; each of said ports having a leading edge and a trailing edge; said exhaust port being so physically and angularly constructed and positioned with respect to said intake port that each of said channels are opened and closed by said leading and trailing edge in the following sequence: opened by said exhaust port, opened by said intake port, closed by said intake port, closed by said exhaust port; the leading edge of said exhaust port being ahead of the leading edge of said intake port whereby an expansion acceleration wave is created in fluid within said channels as said channels are opened by said exhaust port; the trailing edge of said intake port being ahead of the trailing edge of said exhaust port whereby an expansion deceleration wave is created in fluid within said channels as said channels are closed by said intake port.

5. An aerodynamic wave machine having a reverse cycle of operation and comprising a rotor, a first stationary end plate and a second stationary end plate; a plurality of channels carried by said rotor and extending from a first end of said rotor to a second end; means for rotating said rotor about its axis; each of said channels being open at each end; said first stationary end plate being positioned at said first end of said rotor; said second stationary end plate being positioned at said second end of said rotor; a nozzle port and an exhaust port in said first stationary end plate; a pickup port and an intake port in said second stationary end plate; each of said ports having a leading edge and a trailing edge; said exhaust port being so physically and angularly constructed and positioned with respect to said intake port that each of said channels are opened and closed by said leading and trailing edge in the following sequence: opened by said exhaust port, opened by said intake port, closed by said intake port, closed by said exhaust port; the leading edge of said exhaust port being ahead of the leading edge of said intake port whereby an expansion acceleration wave is created in fluid within said channel as said channels are opened by said exhaust port; the leading edge of said intake port being so physically positioned with respect to said leading edge of said exhaust to open the end of the channel when said expansion acceleration wave arrives at the end of the channel, the trailing edge of said intake port being ahead of the trailing edge of said exhaust port whereby an expansion deceleration wave is created in fluid within said channels as said channels are closed by said intake port; the trailing edge of said exhaust port being so physically positioned with respect to said trailing edge of said itnake port to close the end of the channel when said expansion deceleration wave arrives at the end of the channel.

6. An aerodynamic wave machine having a reverse cycle of operation and comprising a rotor, a first stationary end plate and a second stationary end plate; a plurality of channels carried by said rotor and extending from a first end of said rotor to a second end; means for rotating said rotor about its axis; each of said channels being open at each end; said first stationary end plate being positioned at said first end of said rotor; said second stationary end plate being positioned at said second end of said rotor; a nozzle port and an exhaust port in said first stationary end plate; a pickup port and an intake port in said second stationary end plate; each of said ports having a leading edge and a trailing edge; said exhaust port being so physically and angularly constructed and positioned with respect to said intake port that each of said channels is opened and closed by said leading and trailing edge in the following sequence: opened by said exhaust port, opened by said intake port, closed by said intake port, closed by said exhaust port; the leading edge of said exhaust port being ahead of the leading edge of said intake port whereby an expansion acceleration wave is created in fluid within said channel as said channels are opened by said exhaust port; the leading edge of said intake port being so physically positioned with respect to said leading edge of said exhaust to open the end of the channel when said expansion acceleration wave arrives at the end of the channel, said intake port having a trailing edge ahead of said trailing edge of said exhaust port whereby an expansion deceleration wave is created in fluid within said channels as said channels are closed by said intake port; the trailing edge of said exhaust port being so physically positioned with respect to said trailing edge of said intake port to close the end of the channel when said expansion deceleration wave arrives at the end of the channel; said expansion deceleration wave dropping the pressure in said channel to thereby minimize the exhaust flow velocity of fluid through said exhaust port.

7. A wave engine comprising a rotor, a plurality of channels carried by said rotor, said channels extending substantially parallel to the axis of the rotor; means for rotating said rotor about its axis at high speed; said channels each being open at each end; a first stationary end plate on a first end of the rotor closing the channel ends on the first end; a second stationary end plate on the second end of the rotor closing the other channel ends; a first port in said first end plate comprising an operative fluid inlet; a second port in the second end plate comprising a compressed fluid pickup; a third port in said second end plates comprising an inlet for fluid to be compressed; a fourth port in said first end plate comprising a low pressure exhaust; said third port being so constructed and angularly positioned with respect to said fourth port that each channel is opened by said fourth port and subsequently opened by said third port; each channel thereafter passes said third port and is closed at the end registering with said second end plate before it passes said fourth port; each channel traverses said fourth port until an expansion wave generated by the closing of said third port reaches said first end plate; each channel thereafter passes said fourth port and is closed when said expansion wave reaches said first end plate.

8. A wave engine comprising a rotor, a plurality of channels carried by said rotor, said channels extending substantially parallel to the axis of the rotor; means for rotating said rotor about its axis at high speed; said channels each having a first and second end and being open at each end; a first stationary end plate on a first end of the rotor closing the first channel ends; a second stationary end plate on the second end of the rotor closing the second channel ends; a first port in said first end plate comprising an operative fluid inlet; a second port in the second end plate comprising a compressed fluid pickup; a third port in said second end plates comprising an inlet for fluid to be compressed; a fourth port in said first end plate comprising a low pressure exhaust; said third port being so constructed and angularly positioned with respect to said fourth port that the first channel ends are opened by said fourth port before the second channel ends are opened by said third port, the second channel ends are thereafter opened by said third port before the first channel ends are closed by said fourth port; each channel thereafter passes said third port and is closed at the end registering with said second end plate before it passes said fourth port; each channel traverses said fourth port until an expansion wave generated by the closing of said third port reaches said first end plate; each channel thereafter passes said fourth port and is closed when said expansion wave reaches said first end plate; said first port being so angularly positioned with respect to said second port that each channel thereafter passes said first port; the opening of each channel to said first port producing a compression wave in each channel downstream of said operative fluid toward said second end plate; each channel thereafter arrives at said second port when the compression wave reaches said second end plate; each channel thereafter leaving said first port at an interval of time preceding each channel leaving said second port.

9. A wave engine comprising a rotor, a plurality of channels carried by said rotor, said channels extending substantially parallel to the axis of the rotor; means for rotating said rotor about its axis at high speed; said channels each being open at each end; a first stationary end plate on a first end of said rotor closing the channel ends on the first end; a second stationary end plate on the second end of the rotor closing the channel ends on the second end; a first port in the first end plate comprising an operative fluid inlet; a second port in the second end plate comprising a compressed fluid pickup; a third port in said second end plate comprising an intake for fluid to be compressed; a fourth port in said first end plate comprising an exhaust; said third port being so angularly positioned with respect to said fourth port that each of said channels is opened at said fourth port to permit exhaust of the operative fluid therein; each of said channel is thereafter opened at said third port to permit introduction of intake fluid therein when the expansion wave occasioned by the opening of the channel at the fourth port arrives at said first plate and reduces the static pressure in each of said channels to or below the pressure at said third port; each of said channels thereafter passes said third port and is closed at the end registering with said second end plate before it leaves said fourth port; each of said channels traverses said fourth port until an expansion wave generated by the closing of said third port reaches said first end plate; each of said channels thereafter passes said fourth port and is closed when said expansion wave reaches said first end plate; said first port being so angularly positioned with respect to said second port that each of said channels thereafter passes said first port; the opening of each of said channels to said first port producing a compression wave in the gas to be compressed ahead of said operative fluid toward said second end plate; each of said channels thereafter arrives at said second port when the compression wave reaches said second end plate; each of said channels thereafter is closed by leaving said first port at a timed interval preceding the closure of the channel when it leaves said second port; said time interval being equal to the time necessary for the expansion wave generated by the closing of said first port to overtake the interface at the closing edge of the second port.

References Cited in the file of this patent

UNITED STATES PATENTS

| | | |
|---|---|---|
| 2,045,152 | Lebre | June 23, 1936 |
| 2,399,394 | Seippel | Apr. 30, 1946 |
| 2,665,058 | Kantrowitz | Jan. 5, 1954 |
| 2,705,867 | Lewis | Apr. 12, 1955 |
| 2,800,120 | Jendrassik | July 23, 1957 |

FOREIGN PATENTS

| | | |
|---|---|---|
| 220,293 | Switzerland | July 1, 1942 |
| 1,110,779 | France | Oct. 19, 1955 |